June 28, 1960 A. C. LOEDDING 2,942,298
MOLDING APPARATUS
Filed Dec. 28, 1954
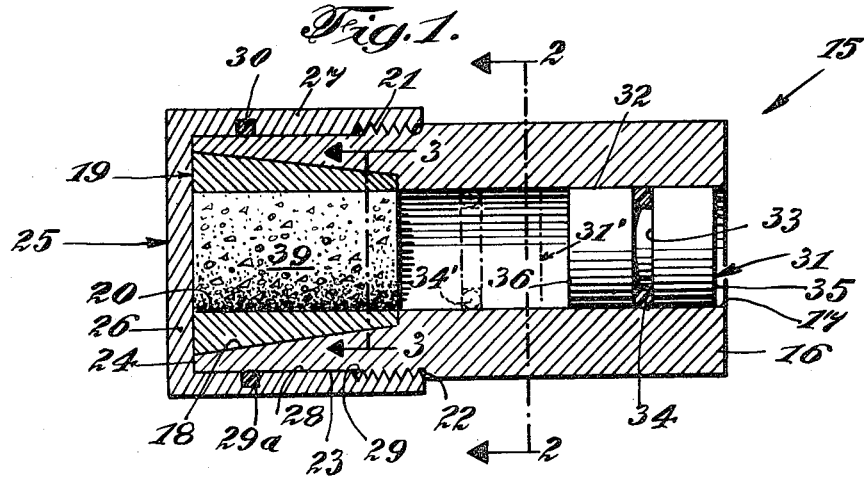
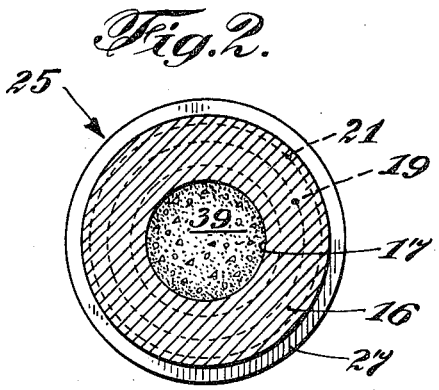
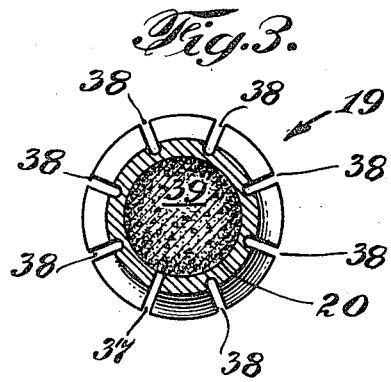
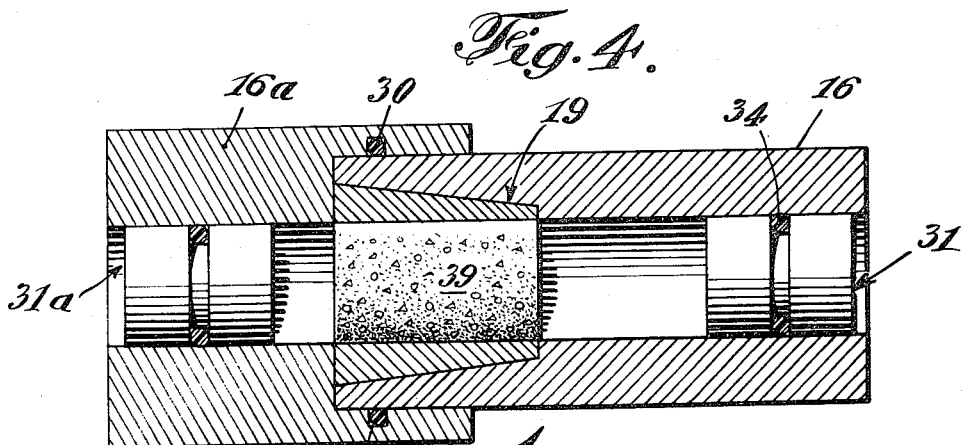
INVENTOR
Alfred C. Loedding
BY C. P. Goepel
his ATTORNEY : 2,942,298
Patented June 28, 1960

2,942,298
MOLDING APPARATUS

Alfred C. Loedding, Princeton, N.J., assignor to Unexcelled Chemical Corporation, New York, N.Y., a corporation of New York Filed Dec. 28, 1954, Ser. No. 478,136

3 Claims. (Cl. 18—34)

This invention relates to an apparatus for hydraulically molding shaped articles as well as sections or sectors thereof, for example, quarters or quadrants, by utilizing moldable materials in solid, divided or fluid form.

This invention is a continuation in part of my earlier application Serial Number 214,921, filed March 10, 1951, for "Method of Forming Charges of Solid Fuels." In said application, I disclose a method of preforming solid fuel charges of granular material and coating the outer surfaces thereof with a fluid excluding material or enclosing the preformed body in a fluid tight bag. The coated or bagged preform is then placed in a pressure vessel containing a fluid and subjected to hydraulic pressure.

Due to the fact that the hydraulic pressure acts equally upon the entire outer surface of the preform, the latter is reduced in size in all directions as it is compressed, and its mass has its greatest density at the outer surface and has the lowest density in the center, with a density gradient therebetween.

According to the present invention, I use a contractible mold which may have a cavity of practically any desired form therein, the cavity being formed in a tapered body which is inserted into the mold and is expandable and contractible to facilitate the removal of the shaped article from the mold cavity.

The invention will be described in greater detail with reference to the accompanying drawing, in which:

Figure 1 is a longitudinal section through a mold or die suitable for the practice of my invention;

Figure 2 is a transverse section taken along the line 2—2 of Figure 1;

Figure 3 is a transverse section taken along the line 3—3 of Figure 1; and

Figure 4 is a longitudinal section through a modified mold or die suitable for the practice of my invention.

In Figures 1 to 3, I show a hydraulic mold 15 which has a tubular body portion or cylinder 16 formed with an internal bore 17, beginning at one end. This body portion or cylinder 16 has a tapered counterbore or passage 18, into which a tapered body or sleeve 19 fits. The sleeve 19 has an internal bore 20 whose diameter preferably equals the diameter of the bore 17, and its body is formed with longitudinal slots 38 which extend substantially radially from the outer side toward but short of the bore 20 whereby the sections of the sleeve 19 between the adjacent slots 38 are angularly movable with respect to each other. Due to the provision of a substantially radial through slot 37, the sleeve 19 may be "opened up" or expanded to facilitate the removal of a molded article therefrom.

The exterior of the rigid body portion or cylinder 16 at the end having the tapered counterbore 18 is stepped and carries external threads 21 adjacent to a shoulder 22 thereon. The body portion 16 is also formed with a straight cylindrical outer surface 23 whose diameter does not exceed the root diameter of the threads 21. The cylindrical surface 23 terminates at the end 24 of the body 16.

A fixed closure for the end 24 of the cylinder 16 consists of a cap 25 which comprises an end plate or head 26 and a tubular portion 27, the latter having an internal cylindrical surface 28 which clears the surface 23 and being formed with an annular groove 29a to accommodate an O ring 30. The free end of the tubular portion 27 has an internally threaded zone 29 to mate with the threads 21 on the body 16.

A freely slidable piston 31 has an outer wall 32 which forms a working fit with the internal bore 17 of the body member 16. The piston 31 also has an annular groove 33 therein to accommodate an O-ring 34, which latter forms a seal with the inner wall 17 of the body 16. The cap 25 is screwed on and forms a fluid tight seal with the surface 23 of the body 16. When the piston or ram 31 is removed, the bore or cavity 17 may be filled with comminuted granular materials or compounds, following which the piston or ram 31 is reinserted into the bore 17. The O-ring 34 then forms a fluid tight seal between the ram and the bore, and the charged or loaded die may be placed into a pressure vessel and subjected to hydraulic pressure. It has been found that the fluid in the pressure vessel will not pass the O-ring and/or the piston or ram 31. In some special cases, where leakage may prove hazardous or costly, the entire die may be placed into an elastic fluid tight envelope without interfering with the hydraulic action. As the hydraulic pressure builds up in the pressure vessel, it acts against one end 35 of the piston and forces it inwardly so that the other end or head 36 thereof acting against the granular material in the die compresses the same, and depending upon the pressures employed and upon the time of the dwell produces a consolidated mass 39 which may, for example, occupy the space within the sleeve member 19. The piston or ram 31 and its sealing ring 34 then assume their phantom-line positions 31', 34', respectively. I have found that in removing the die from the pressure vessel, the die and the contents of the die will be damaged if the hydraulic pressure is reduced too rapidly. It is therefore advisable to reduce the pressure somewhat gradually.

Figure 4 illustrates a modified mold 15a in which a comparatively short second cylinder 16a takes the place of the cap 25 shown in Figure 1. A second piston 31a forms a working fit with and is reciprocable in the axial directions of the second cylinder 16a. Owing to such arrangement, the mold 15a is readily separable into its component parts 16, 16a, 19, and permits convenient removal of the tapered sleeve element 19. In use, the pistons or rams 31, 31a are urged toward each other by non-represented hydraulic means whereby the resilient pressing or molded article 39 has a density gradient from each end toward the center.

Although only two embodiments of my invention have been illustrated and described in detail, it is to be particularly understood that I do not desire to be limited thereto or thereby but solely by the scope of the appended claims.

I claim:

1. In apparatus for hydraulically molding articles, a rigid mold generally cylindrical in form and having a coaxial passage formed therein, said passage having a portion thereof which is tapered, a tapered body having a passage therein which coincides with said first passage, a closure cap for retaining said body in said tapered cavity, said body being fabricated to render it expandable and contractible, a piston-like closure sealed to and forming a working fit within said pasage, said closure being movable within said passage in accordance with hydraulic pressures applied thereto after said passages have been charged with moldable materials.

2. In apparatus for hydraulically molding articles from moldable materials, a rigid mold generally cylindrical in form and having a coaxial passage formed therein, said passage having a portion thereof which is tapered, a tapered body positioned in said tapered portion and having an article cavity therein which communicates with said first passage, a piston reciprocally carried in said passage on one side of said tapered portion, and a second piston reciprocally carried in said first passage on the other side of said tapered portion, said pistons being conjointly urged toward each other by hydraulic pressure with said moldable material therebetween.

3. In an apparatus for molding shaped articles from finely divided materials, a rigid mold having a tapered passage; a body within said passage having a tapered exterior forming a fit within said passage, said body being formed with a cavity normally larger than the size of the desired shaped article and being expandable and contractible to facilitate the removal of a molded article therefrom; and rigid means within said mold, extendable into the cavity and motivated by hydraulic pressure for reducing the volume of said cavity, said means being maintained in fluid tight relation with the adjacent walls of said mold.

References Cited in the file of this patent

UNITED STATES PATENTS

| Number | Name | Date |
|---|---|---|
| 669,279 | Harrington | Mar. 5, 1901 |
| 690,728 | Hollings | Jan. 7, 1902 |
| 731,367 | Huber | June 16, 1903 |
| 1,081,618 | Madden | Dec. 16, 1913 |
| 1,230,013 | Morwitz | June 12, 1917 |
| 1,972,440 | Evans | Sept. 4, 1934 |
| 1,989,724 | Villanyi | Feb. 5, 1935 |
| 2,133,675 | Ten Boschnjzn | Oct. 18, 1938 |
| 2,152,738 | Jeffery | Apr. 4, 1939 |
| 2,235,906 | Skoning | Mar. 25, 1941 |
| 2,276,004 | Vidal et al. | Mar. 10, 1942 |
| 2,319,014 | Smith | May 11, 1943 |
| 2,327,241 | Berger | Aug. 17, 1943 |
| 2,333,131 | Tillyer et al. | Nov. 2, 1943 |
| 2,416,137 | Auxier et al. | Feb. 18, 1947 |
| 2,418,333 | Caldwell et al. | Apr. 1, 1947 |
| 2,446,038 | Amigo | July 27, 1948 |
| 2,582,922 | Crowley et al. | Jan. 15, 1952 |
| 2,583,085 | Campbell | Jan. 22, 1952 |
| 2,648,125 | McKenna et al. | Aug. 11, 1953 |
| 2,836,848 | Zink et al. | June 3, 1958 |
| 2,840,856 | Moxness | July 1, 1958 |
| 2,841,823 | Van Hartsveldt | July 8, 1958 |
| 2,847,708 | Hamjian et al. | Aug. 19, 1958 |

FOREIGN PATENTS

| Number | Country | Date |
|---|---|---|
| 440,562 | Great Britain | Dec. 27, 1935 |
| 61,382 | Sweden | Aug. 17, 1926 |